United States Patent [19]
Barthalow et al.

[11] Patent Number: 5,927,520
[45] Date of Patent: *Jul. 27, 1999

[54] ELECTRO-HYDRAULIC OPERATING SYSTEM FOR EXTENSIBLE BOOM CRANE

[75] Inventors: Henry D. Barthalow; William E. Hull, both of Greencastle; Claude R. Zimmerman, Mercersburg, all of Pa.

[73] Assignee: Kidde Industries, Inc., Shady Grove, Pa.

[*] Notice: This patent issued on a continued prosecution application filed under 37 CFR 1.53(d), and is subject to the twenty year patent term provisions of 35 U.S.C. 154(a)(2).

[21] Appl. No.: 08/539,953

[22] Filed: Oct. 6, 1995

[51] Int. Cl.$^6$ .................................................. B66C 23/04
[52] U.S. Cl. .............................. 212/289; 91/361; 91/529; 212/349
[58] Field of Search ...................................... 212/349, 230, 212/231, 288, 289, 264; 91/529, 533, 361

[56] References Cited

U.S. PATENT DOCUMENTS

| | | | |
|---|---|---|---|
| 3,610,433 | 10/1971 | Milner et al. | 212/289 |
| 3,777,629 | 12/1973 | Johnston et al. | 212/231 |
| 3,777,899 | 12/1973 | Witner | 212/289 |
| 4,011,699 | 3/1977 | Mickelson | 212/288 |
| 4,358,989 | 11/1982 | Tordenmalm | 91/361 |
| 5,131,475 | 7/1992 | Beney . | |

FOREIGN PATENT DOCUMENTS

| | | |
|---|---|---|
| 2255840 | 11/1992 | United Kingdom . |
| 9517343 | 6/1995 | WIPO . |

OTHER PUBLICATIONS

Prof. Dr. –Ing. W. Backe. "Grundlagen der Olhydraulik". 1988. Institut fur Hydraulische und Pneumatische Antriebe und Steuerungen der Rheinisch–Westfalischen Hochschule Aachen. Aachen XP002071725. pp. 7–38; figure 7.34.

Kirst, Thomas. "Hydraulik, Fluidtechnik". 1987. Vogel Buchverlag. Wurzburg XP002071726. pp. 211–212; figure 11.3.13.

*Primary Examiner*—Thomas J. Brahan

[57] ABSTRACT

An electro-hydraulic operating system for an extensible boom includes one or more hydraulic cylinders for imparting relative motion between the boom sections to retract the boom according to an electronically stored program of sequences of movement and speeds. A source of pressurized hydraulic fluid is fed through appropriate control valves which include solenoid valves in fluid communication with a source of pressurized hydraulic fluid. The solenoid control valves are supplied with control currents proportional to the desired flow rates of fluid to the hydraulic cylinders in order to achieve speed and position control according to the stored program. A metering valve structure is provided for operation in conjunction with the solenoid control valves. The metering valve includes an associated pilot valve which receives variable pressure signals from the solenoid control valves to achieve the metering of fluid to the hydraulic cylinders in proportion to the characteristics of the control current supplied to the solenoid valves. The electrical control signals are such that the hydraulic cylinders may move associated boom sections at gradually increasing speeds during a starting period of any cycle of movement of the section, at a substantially constant speed during an intermediate period of movement and at a gradually decreasing speed during a stopping period preceding the end of the cycle of movement, thereby providing soft start and soft stop of the sections.

12 Claims, 11 Drawing Sheets

ELECTRO-HYDRAULIC OPERATING SYSTEM FOR EXTENSIBLE BOOM CRANE

BACKGROUND OF THE INVENTION

The present invention relates to an electro-hydraulic operating system for an extensible boom of a crane or the like. More specifically, the present invention relates to an improved valving system for enabling independent actuation and speed control of respective boom sections of a multi-stage boom.

Heretofore, operating systems of multi-stage booms for cranes, aerial work platforms or the like have taken various forms. In simplest form, the operating system may be primarily hydraulic with mechanical actuation controls. In more sophisticated forms, the operating system is electro-hydraulic, and the input control functions to the hydraulic cylinders are electrically generated by an operator from a control console in the cab of the crane. Whether the operating systems are primarily hydraulic or electro-hydraulic, some of the control functions of the boom of the crane are semi-automatic, and some are desirably completely automatic, not requiring any operator intervention.

Whatever type of operating system is employed for the multi-stage extensible boom of a crane or the like, operation of the system is extremely complex for an operator involving a great deal of training and skill. Accordingly, it is highly desirable to be able to automate the operation of extensible booms as much as possible in order to decrease the learning curve for operators, and also to implement automatic safety features. In order to accomplish this, some automated systems presently available utilize electronically programmable microprocessors to control the movement of the respective extensible sections of a multi-stage boom. Various features are programmed into the microprocessor, such as essential safety features relating to boom length; the relative location of boom sections for specific tasks; and the azimuth of the boom.

Conventionally, operators of cranes are provided with "load tables" for different optimum modes of operation. For example, a "load table" for optimum stability would be provided which specifies different extension lengths of respective boom sections, overall boom length and preferred sequences of movement of the respective boom sections to achieve the final section positions in the selected mode of operation. A similar type of table would be provided for optimum strength applications for the boom. Tables of this type are very complex and much training is required before an operator is facile with the various aspects. Accordingly, it is desirable to be able to program these tables into a microprocessor, so that these optimum modes of operation can be implemented automatically under control of the microprocessor with only minimal operator assistance.

Another important control function for extensible boom cranes is the speed of movement of the respective sections of the boom, not only during steady state movement within any movement cycle of a given section, but also at the beginning, or start, of movement and at the end, or stopping, of the movement of the section. Naturally, it is desirable to be able to automate controls of this type to avoid the need for operator control or assistance.

Accordingly, there is a need in the art for an improved electro-hydraulic valving system which is compatible with the needs of microprocessor controlled, multi-stage extensible booms for cranes or the like.

SUMMARY OF THE INVENTION

Accordingly, it is a primary object of the present invention to provide a valving system for the operating system of an extensible boom which is compatible with electrical control signals generated by a microprocessor. It is a further object of the present invention to provide a metering valve assembly which is compact and requires a minimum amount of space so that it may be disposed within the moveable sections of an extensible boom.

It is another object of the present invention to provide an electro-hydraulic operating system for the boom of a crane having a minimum number of fluid conduits between the respective hydraulic cylinders which drive the sections of the boom.

It is yet another object of the present invention to provide an electro-hydraulic valving system capable of providing accurate and automatic speed control of the respective boom sections of an extensible boom.

It is still another object of the present invention to provide an electro-hydraulic valving system having automatic speed control for providing soft starts and stops of the respective boom sections in order to prevent judder.

The objects of the present invention are fulfilled by providing an electro-hydraulic operating system for an extensible boom, said boom having at least three telescoping sections, comprising:

at least two fluid motors coupled to the boom sections for imparting relative motion therebetween to extend or retract the boom;

a source of pressurized hydraulic drive fluid for powering the motors; and valve means coupled in fluid communication with the source of fluid and the fluid motors for selectively supplying the pressurized hydraulic drive fluid thereto in response to electrical control signals;

said valve means in association with each of said fluid motors including,
   a solenoid valve in fluid communication with the source of pressurized hydraulic drive fluid and the fluid motor having an input for receiving electrical control signals with variable characteristics proportional to desired speeds of movement of the boom section driven by the fluid motor, said solenoid valve varying the pressure of the drive fluid available for application to the fluid motor, and outputting variable pressure fluid drive signals; and
   a metering valve for receiving the variable pressure drive signals output from said solenoid valve and supplying drive fluid to the fluid motor at flow rates proportional to the variable pressure drive signal.

Preferably the electrical-control signals are provided or triggered by a programmable electronic control means such as a microprocessor. Speed control by the microprocessor is affected such that the characteristics of the electrical-control signals applied to a given fluid motor for driving a particular boom section causes the boom section to gradually increase speeds during a starting period of any cycle of movement of the section; to move the boom section at a second substantially constant speed during an intermediate period of the cycle; and to move the boom section at a gradually decreasing speed during a stopping period proceeding the end of the cycle of movement of the given section. This provides for soft start and stop of the boom sections and prevents judder.

In the alternative, the microprocessor can be programmed to provide for soft start only, or soft stop only, in combination with the steady state movement of the section in its intermediate operating range.

The objects of the present invention are further fulfilled by providing an improved, compact structure for a metering valve which controls operation of each of the fluid motors or hydraulic cylinders which comprises:

a housing assembly defining a metering cavity therein, at least one inlet port for supplying fluid to be metered to the cavity, at least one output port for outputting metered fluid from the cavity, a valve seat in the cavity disposed between the input and output ports, a pilot chamber and a pilot port to said pilot chamber;

a control element in the pilot chamber displaceable in proportion to the pressure of pilot fluid input to said pilot port;

a valve spool mounted for reciprocating movement in said metering cavity, said spool being coupled to the control element and displaceable therewith, said spool having a metering flange for operative engagement with the valve seat in the cavity, the position of said metering flange with respect to said valve seat controlling variable flow rates of fluid between the input port and the output port of the valve housing assembly; and a thermal-relief valve disposed within said spool and moveable therewith, said thermal-relief valve venting fluid in said cavity through the input port when the pressure of fluid in the cavity exceeds a predetermined limit.

The metering flange of the metering valve has metering channels formed therein extending transversely of the valve seat, said channels presenting variable volume flow passages to fluid flow past the valve seat proportional to the displacement of the spool.

The metering valve construction of the present invention is very compact in that each of the operative components, namely the pilot chamber and associated moveable pilot element; the moveable spool; and the thermal-relief valve are all disposed in-line on a common longitudinal axis. This compact structure enhances the ability to locate the valve assembly within appropriate positions within the extensible, multi-stage boom.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The objects of the present invention and the attendant advantages thereof will become more readily apparent by reference to the drawings wherein like reference numerals refer to like parts and wherein.

DETAILED DESCRIPTION OF PREFERRED EMBODIMENTS

Figure 1:
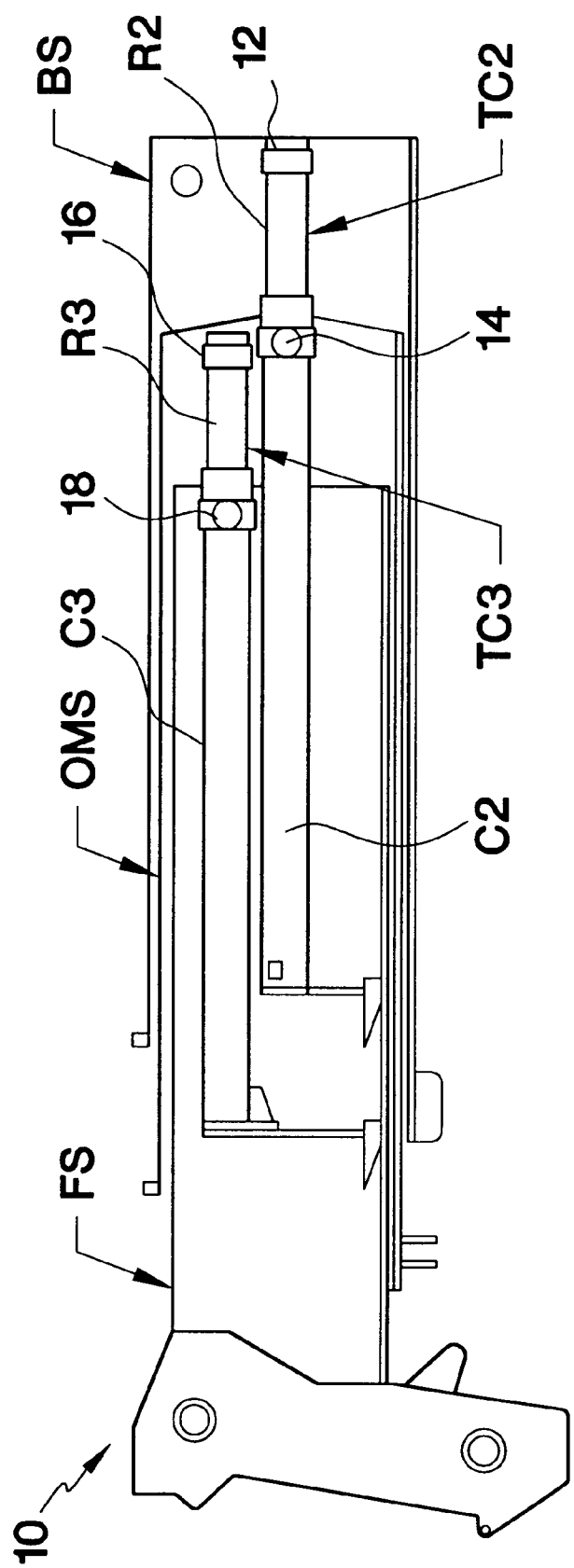
FIG. 1 is a diagrammatic view of a boom having three (3) extensible sections illustrating the manner in which two (2) hydraulic cylinders are mounted within the boom in order drive the respective sections.

Referring to FIG. 1 there is illustrated an example of a multi-stage extensible boom 10 with hydraulic cylinders mounted therein for selective extension and retraction of the respective boom sections. FIG. 1 depicts a three section boom including a base section BS, an outer-mid section OMS and a fly section FS. These sections all telescope along a common axis and are movable relative to each other when driven by telecylinders TC2 and TC3.

Telecylinder TC2 includes a rod R2 secured to base section BS and a cylinder C2 secured to outer midsection OMS. Suitable fittings are provided at 12 and 14 in order to provide hydraulic fluid to appropriate sections of the telecylinder. Telecylinder TC3 is connected at its rod R3 to outer midsection OMS and at its cylinder section C3 to fly section FS. Fittings 16 and 18 are provided to supply and exhaust hydraulic fluid to telecylinder TC3.

Figure 2:
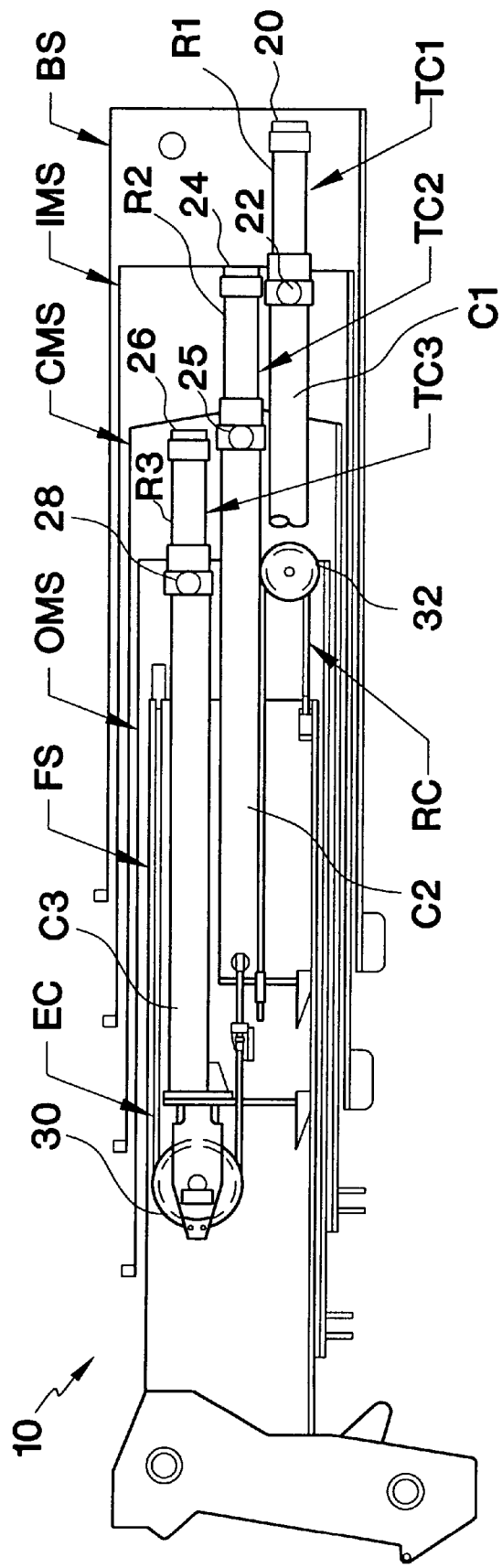
FIG. 2 is a similar illustration to that of FIG. 1 for a five-section boom, wherein in addition to three (3) hydraulic cylinders for driving the boom sections, a cable and reel-driving assembly is provided for movement of the "fly" or fifth section of the boom.

FIG. 2 is a diagrammatic illustration of an extensible boom 10 similar to that of FIG. 1 but having five extensible sections including a base section BS, an inner-mid section IMS, a center-mid section CMS and outer-mid section OMS and a fly section FS. The base section BS, inner-mid section IMS, center-mid section CMS and outer-mid section OMS are selectively and relatively movable by three hydraulic cylinders TC1, TC2, TC3. Cylinder TC1 is connected between base section BS and inner-mid section IMS by securing rod section R1 to base section BS and cylinder section C1 to inner-mid section IMS.

Cylinder TC2 is connected between inner-mid section IMS and center-mid section CMS by securing rod section R2 to inner-mid section IMS and cylinder section C2 to center-mid section CMS.

Cylinder TC3 is connected between center-mid section CMS and outer-mid section OMS by connecting rod section R3 to center-mid section CMS and cylinder section C3 to outer-mid section OMS.

Fly section FS of FIG. 2 is powered by a cable and sheave assembly including extend cables EC, sheave 30, retract cables RC and sheave 32. The operation of such a cable assembly is well known in the art.

The cylinders TC1, TC2 and TC3 are provided with appropriate fluid fittings for receiving and exhausting hydraulic fluid. Cylinder TC1 is provided with fittings, 20, 22; Cylinder TC2 with fittings 24, 25; and cylinder TC3 with fittings 26, 28.

Extension and retraction of the respective hydraulic cylinders causes relative movement of the boom sections between which they are connected.

Figure 3:
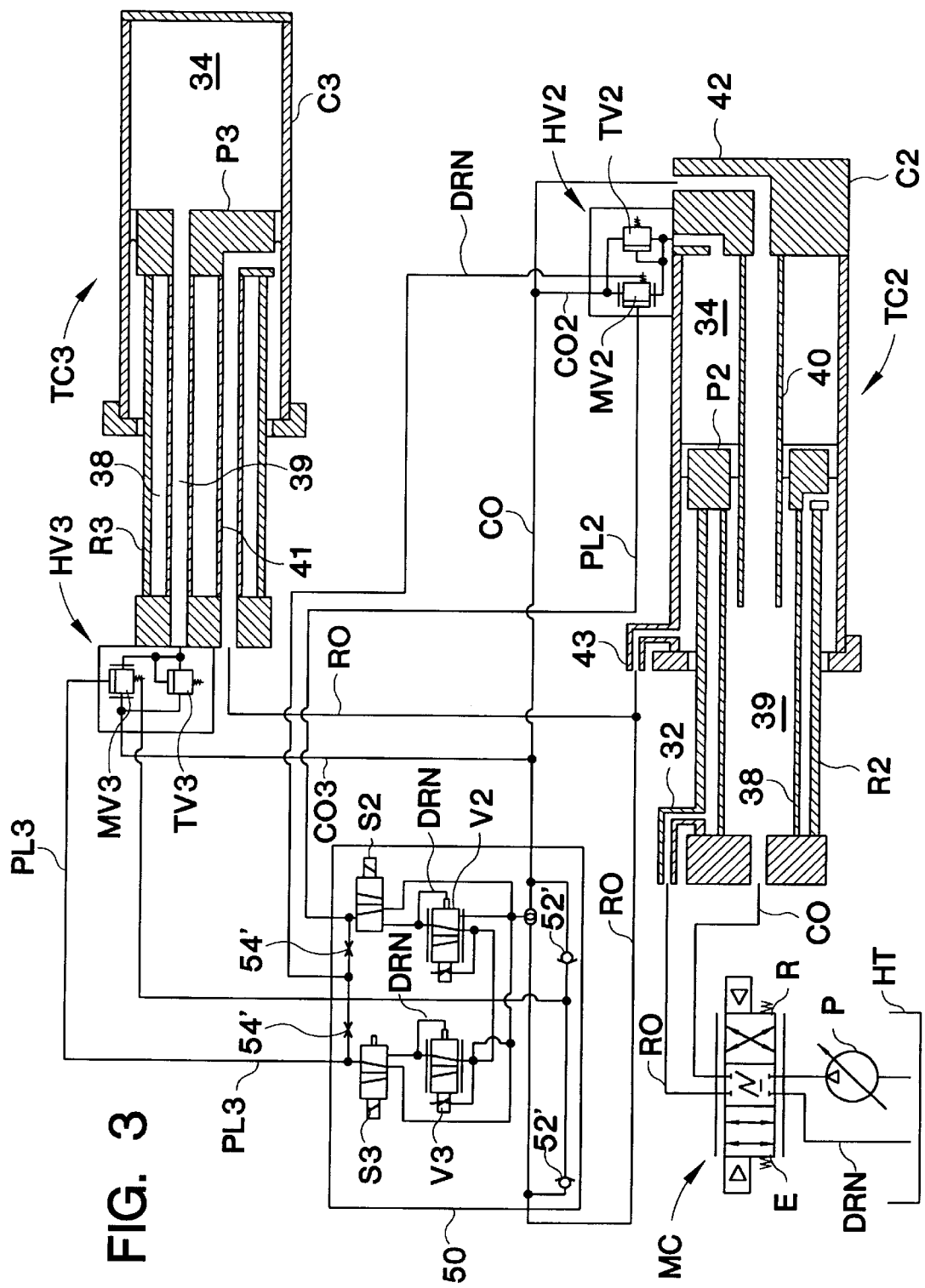
FIG. 3 is a schematic diagram of an electro-hydraulic control system of the present invention for driving two (2) hydraulic cylinders such as those illustrated in FIG. 1 for a three (3) section boom.

FIG. 3 illustrates an electro-hydraulic control system for driving cylinders TC2 and TC3 in the extensible boom of FIG. 1. A main supply of hydraulic fluid (oil) is provided in a holding tank HT in fluid communication with a pump P. The pump is adjustable to output hydraulic fluid of a selected pressure. A three position, master control valve MC is connected to the output side of pump P and a drain line DRN to the holding tank HT. Master control valve MC has three sections E, N, R. In the position indicated in FIG. 3, section N is aligned with the four input and output ports of the master control valve and all fluid flow through the valve is blocked as illustrated.

Master control valve MC also includes a control device (hydraulic, electrical or mechanical) (not shown) for moving the valve between its respective neutral, extend and retract positions. If the spool is moved to the right this aligns section E with the input and output ports of the control valve, and causes cylinders TC2 and TC3 to be supplied with hydraulic drive fluid for extending those cylinders. If the spool is moved to the left this causes section R of the master control valve MC to be aligned with the input and output ports thereof. This enables one or both of the cylinders TC2 and TC3 to be retracted in a manner to be described hereinafter. Connected to one of the output ports of master control valve MC is a group of conduits CO for supplying cylinder oil to the respective hydraulic cylinders TC2 and TC3.

Cylinder TC2 is provided with a rod R2 and a cylinder C2. Rod R2 includes a concentric tube 38 therein defining a flow channel 39 for cylinder oil from conduit CO which passes from rod R2 through a tube 40 in fluid communication with tube 38 and an output passage 42 in the end of cylinder C2. The cylinder oil continues from passage 42 to the output side of cylinder C2 through conduits CO to hydraulic control valves downstream of cylinder C2.

Cylinder TC2 is provided with a reciprocating piston P2 which defines a cylinder extension chamber 34. The other side of piston P2 is in fluid communication with an annular chamber for containing rod oil defined between tube 38 and the inner walls of cylindrical rod R2. Ports 32 and 43 are provided for the flow of rod oil to a group of conduits RO from the annular chamber within the rod.

A second hydraulic cylinder TC3 is provided and connected downstream of cylinder TC2. The hydraulic fluid for driving cylinder TC3 is fed through cylinder TC2 and the internal conduits therein thus avoiding the need for extra flexible hoses or tubing for connecting the source of pressurized fluid in holding tank HT to cylinder TC3.

Since cylinder TC3 is at the terminal end of the hydraulic fluid flow path in the schematic of FIG. 3 it has a different internal construction of flow channels to that of the cylinder TC2. That is, there is no fluid flow out of the cylinder end C3 of cylinder TC3. Cylinder oil is supplied through a channel 39 into chamber 34 to the cylinder side of a piston P3 through the interior of rod R3. Channel 39 is defined by an annulus between concentric tubes 39 and 41 within rod R3. Rod oil can flow out of port 36 when piston 43 moves left.

Figure 9A:
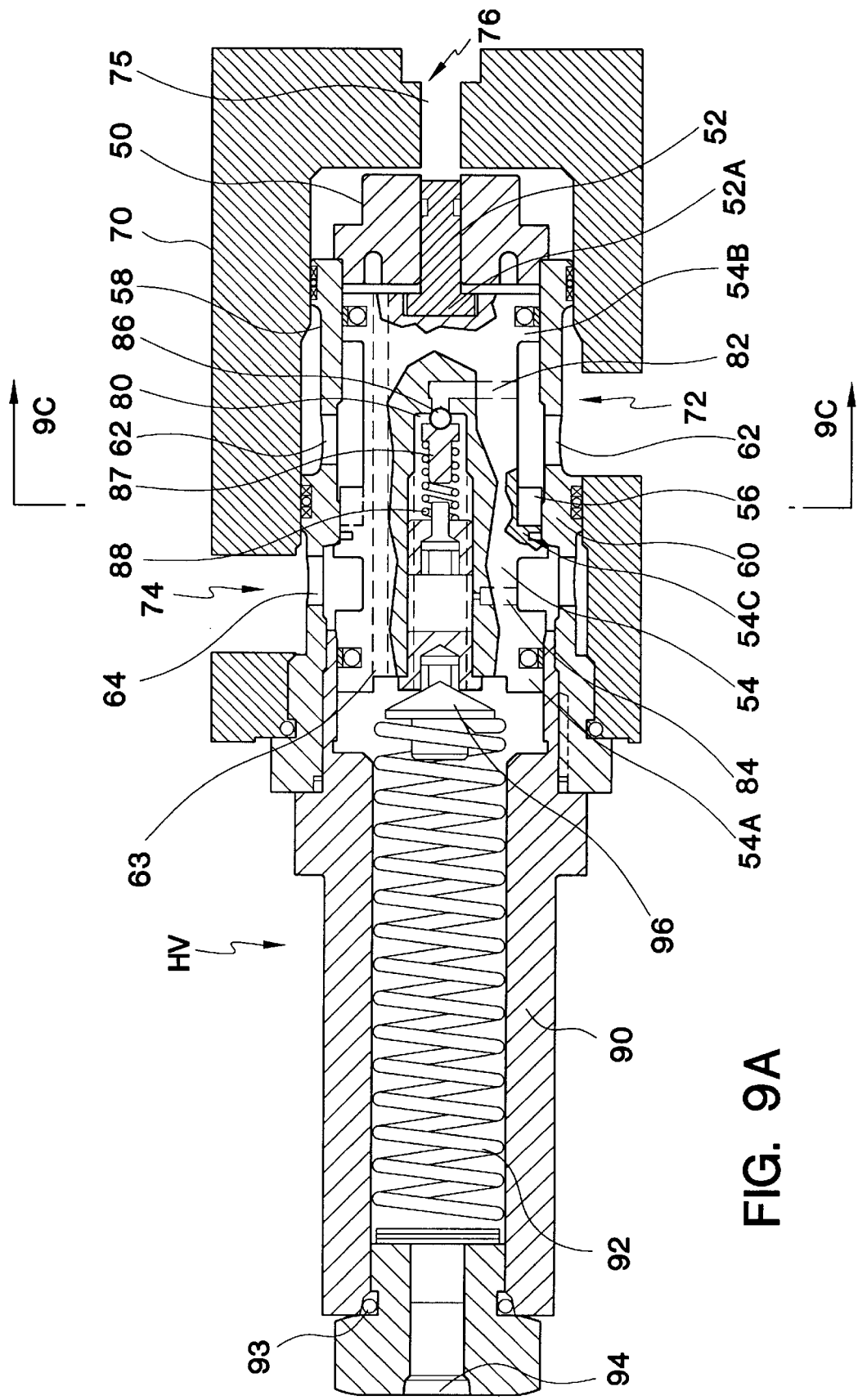
FIGS. 9A, 9B, and 9C illustrate the structure of an improved metering valve assembly in accordance with the present invention.
Figure 9B:
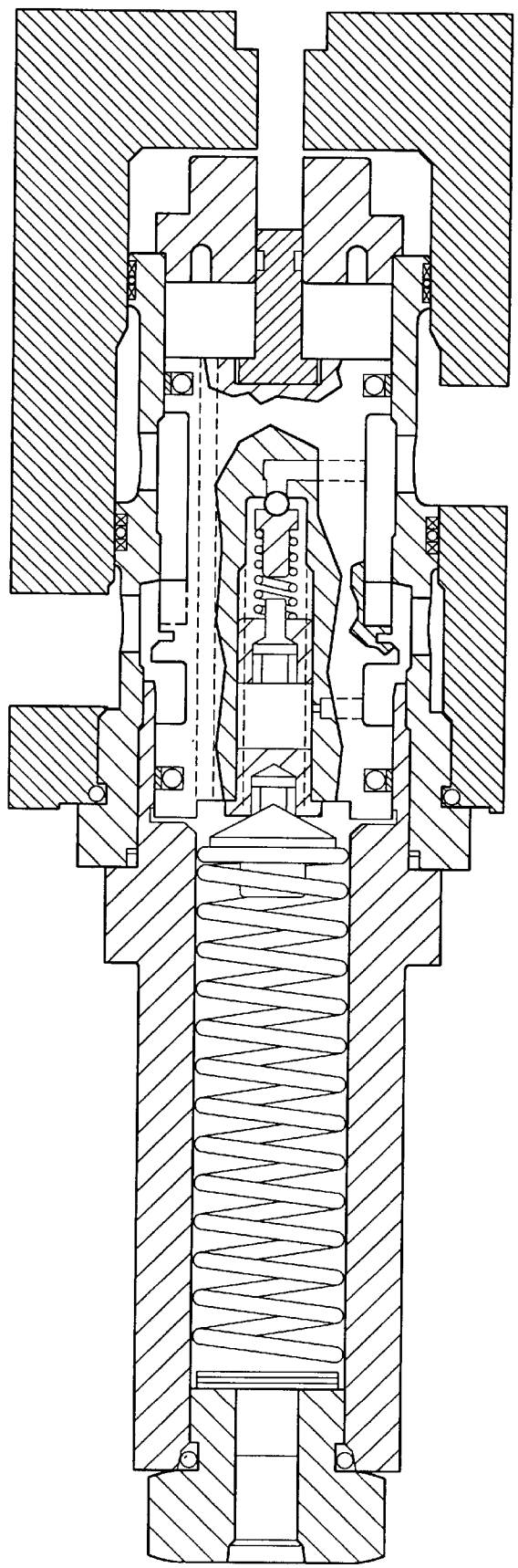
Figure 9C:
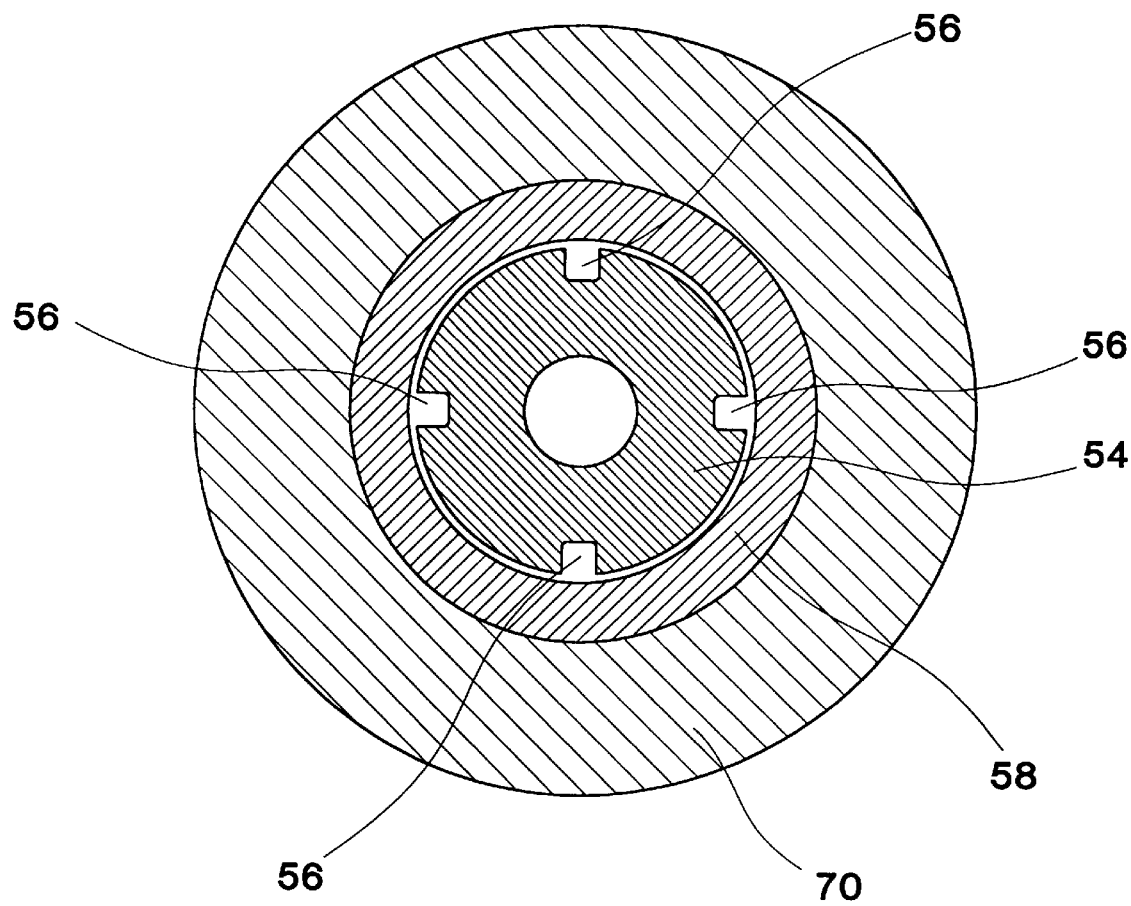

Each cylinder TC2 and TC3 is provided with a holding valve HV2 and HV3, respectively. These holding valves are essentially identical and are illustrated in FIGS. 9A to 9C to be described in more detail hereinafter. Each includes a metering valve assembly MV2, MV3 and a thermal relief valve assembly TV2, TV3. The metering valves MV2 and MV3 are normally closed unless throttled open by pilot fluid supplied through lines PL2, PL3. When the holding valves HV2, HV3 are closed this holds the hydraulic cylinders TC2 and TC3 in equilibrium and the cylinders will neither extend nor retract. However, when pilot fluid pressure is supplied through lines PL2 and/or PL3 metering valves MV2, MV3 will open in proportion to the pressure of the pilot fluid and permit the flow of cylinder oil into or out of chambers 34 at flow rates proportional to the pressure of the pilot fluid. If the fluid pressure within the valve housing of metering valves MV2, MV3 exceeds a predetermined limit, such as might be caused by high temperatures within the surrounding boom sections, fluid will be vented out of these valves through thermal relief valves TV2, TV3. The manner in which this is effected will be better understood by a reference to FIGS. 9A to 9C to be described hereinafter.

A pilot fluid control valve module 50 is provided for selectively routing pilot fluid to holding valves HV2, HV3 and their associated metering valves MV2, MV3 through pilot fluid supply lines PL2, PL3. The control module 50 includes solenoid actuated pressure reducing proportioning control valves V2, V3. Valve V2 is in fluid circuit with pilot pressure supply line PL2 and metering valve MV2; and valve V3 is in fluid communication with pilot pressure supply line PL3 and metering valve MV3. Line PL2 is connected to a pilot port of metering valve MV2 and line PL3 is connected to a pilot port in metering valve MV3. Check valves 52' in module 50 are provided to prevent backflow in the extend or retract modes. Flow restrictors 54' regulate flow to the drain line DRN.

Valves V2 and V3 are substantially identical, two-position pressure reducing proportioning valves. Each has a solenoid coil connected in circuit with the central processing unit (CPU) to be described further hereinafter with respect to FIGS. 5 and 6. Each of the solenoid coils receives a drive current proportional to the desired fluid pressure output of pilot fluid passing through the valve. Each valve is normally closed and opens in response to the application of a current or voltage to the solenoid coil. In the positions shown in FIG. 3 valves V2 and V3 are both in the closed position as indicated by the arrow designations of the respective sections of the valve. Valves V2 and V3 are commercially available valves manufactured by Hydra Force, Inc. of Lincolnshire, Ill. as Model No. TS1O-36 in catalog HFTC 03195-15M, 1995/96.

The output conduits of each respective valve V2 and V3 are connected in series with normally closed and energized solenoid valves S2, S3. Valves S2, S3 are two-position, three-way valves. These valves are manual override valves which can be switched to their opposite positions if desired to override operation of valves V2, V3 permitting manual control of the boom sections under appropriate conditions. For example, if a fault occurs in the CPU control system the crane boom could still be manually controlled by the operator to extend or retract the boom using valves S2, S3. Valves S2, S3 are manufactured by Hydra Force, Inc. of Lincolnshire, Ill. in catalog HFTC 03195-15M, 1995/96 as Model No. SV08-30.

The two cylinder electro-hydraulic control system depicted in FIG. 3, as stated hereinbefore, operates the three-section extensible boom of FIG. 1. Movement of the respective cylinders TC2 and TC3 is under the selective and independent control of proportional pressure control valves V2 and V3, respectively. Appropriate current control signals from the CPU are provided to the solenoid coils at the input of these respective valves in order to selectively supply pilot fluid in the lines PL2 and PL3 to the respective valves HV2, HV3. The sequence of operation of the associated cylinders TC2, TC3 under control of the valves V2 and V3 will be described in detail hereinafter with respect to operation of a fully powered four-section boom of FIG. 5, or the five-section boom of FIG. 2.

Figure 4:
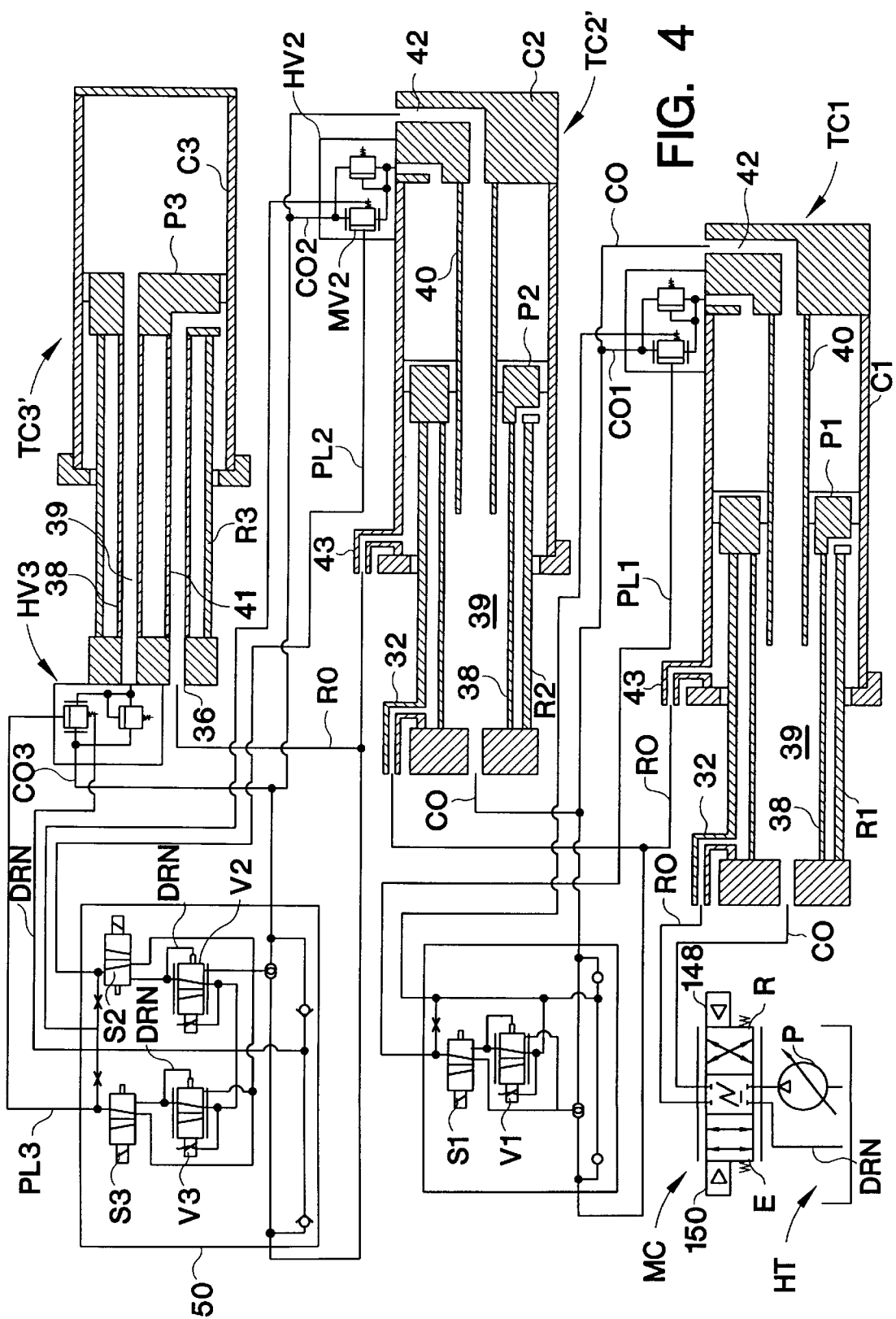
FIG. 4 is a schematic of an electro-hydraulic control system for driving three (3) hydraulic cylinders such as those illustrated in the boom in FIG. 2.
Figure 5:
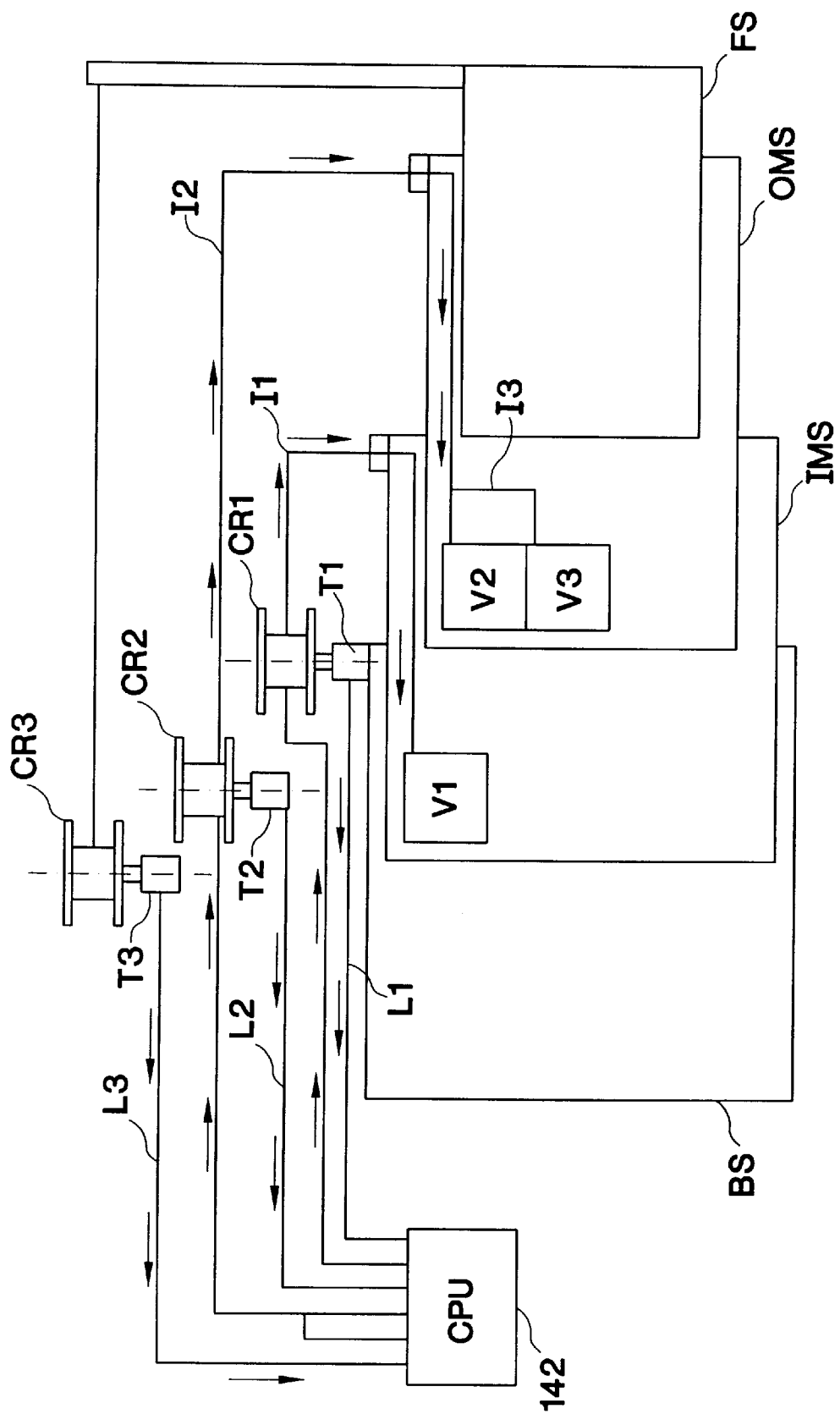
FIG. 5 is a schematic diagram of the electronic control system of the present invention including a CPU for controlling the movement of the respective sections of a fully powered four (4) section extensible boom in accordance with the present invention utilizing the electro-hydraulic control system of FIG. 4.

Referring to FIG. 4 there is illustrated an electro-hydraulic control system for actuating the three hydraulic cylinders TC1, TC2, TC3 in either the five-section boom of FIG. 2, or four-section boom of FIG. 5. In this figure like reference numerals refer to like parts in the FIG. 3 hydraulic control system. For example, the cylinders TC2 and TC3 as well as the associated parts thereof in the FIG. 4 embodiment are essentially as described in the two-cylinder FIG. 3 embodiment. However, a third cylinder TC1 is added at the input side of the system in communication with the master control valve MC. In addition a third, solenoid-operated, proportional pressure valve V1 is provided for supplying variable pilot pressure through the line PL1 to a third holding valve HV1 associated with third cylinder TC1. Holding valve HV1 is essentially identical to holding valves HV2 and HV3 and includes both a metering valve MV1 and a thermal relief valve TV1. The output side of proportional pressure valve V1 is also connected to an associated manual override solenoid valve S1 which is essentially identical in form and operation to manual override solenoid valves S2 and S3.

The hydraulic control systems illustrated in both FIGS. 3 and 4 also include appropriate drain lines DRN for providing a path for overflow fluid from each of the respective valves in order to relieve any undesirable pressure which would adversely effect their operation.

The operation of the two cylinder electro-hydraulic control system of FIG. 3 will now be generally described. The boom control logic valve assembly 50 is designed to control the opening and closing of the respective hydraulic cylinders TC2 and TC3 by opening and closing the respective holding valves HV2 and HV3. The proportional pressure reducing valves V2 and V3 vary the hydraulic oil pressure needed to open or allow closing of the respective cylinder holding valves HV2, HV3.

The details of the holding valves will be described in more detail with respect to FIGS. 9A to 9C but the metering spool of these valves has an equal area design, and flow metering capabilities depending on its position within the valve housing with respect to a valve seat, in proportion to the pressure of pilot fluid supplied through lines PL2, PL3. The pilot pressure in lines PL2 and PL3 is of course controlled by the pressure of fluid output from the respective pressure reducing proportioning valves V2, V3 which output fluid having pressure proportional to the magnitude of control current applied to the input solenoid coils thereof.

The position of the rods and pistons P2, P3 within the respective cylinders TC2 and TC3 are controlled by closing or opening the associated holding valves HV2, HV3 in response to the pilot pressure signals input from pilot lines PL2, PL3. When the respective holding valves HV2, HV3 are closed the associated cylinder cannot extend or retract. When the respective holding valves are open, each allows hydraulic fluid to flow into or out of the piston chambers 34 of the respective cylinders permitting the rods of the cylinders to extend or retract.

The proportional pressure reducing valves V2 and V3 are independently operable in response to signals received from the central processing unit CPU. The valves V2 and V3 may be operated either synchronously or sequentially depending on the mode of operation desired for extending or retracting the boom. The particular mode of operation is preprogrammed from optimum load tables stored in the memory of the microprocessor of the CPU. This feature of the present invention will be described in detail with respect to Table I to follow and the electronic circuit schematics illustrating the central processing unit CPU in FIGS. 5 and 6.

Operation of the electro-hydraulic control systems illustrated in FIGS. 3 and 4 is as follows. Fluid is supplied by pump P at a selectable pressure and is distributed by the master control valve MC to either extend or retract telescoping cylinder TC2, TC3, or an additional cylinder such as TC1 in the control system of FIG. 4. These cylinders may be extended or retracted according to load tables stored in the microprocessor of the CPU, and movement of the cylinders could be sequential or synchronous, depending on the instructions stored in the load tables.

As fluid pressure is supplied through line CO to the cylinder TC2 or TC3 the fluid can enter the cylinder chamber 34 on the right side of pistons P2, P3 only if valves HV2 and HV3 have pilot pressure applied through lines PL1 and PL2. This pilot pressure will be provided only if valves V2 and V3 have received an electrical signal applied to their solenoid input coils which open these valves and supply the required pilot pressure through lines PL2 and PL3 to the pilot ports of metering valves MV2, MV3. When metered fluid passes through metering valves MV2 and MV3 in response to appropriate pilot pressure, fluid flow proportional to the pilot pressure applied is allowed to flow into cylinder chambers 34 and extend the cylinders.

As fluid pressure is directed to the rod areas of the cylinder through lines R0, fluid can enter the cylinder rods R2, R3 only if valves V2 and V3 have received an electrical signal opening these valves and thus directing appropriate pilot pressure to valves HV2, HV3. When pilot pressure is applied to valves HV2, HV3 these valves can open allowing fluid pressure to enter the rod areas of the cylinders TC2 and TC3 in order to retract the rods.

However, the direction of movement between the rod portions of the telescopic cylinders and the cylinder portions are controlled by the master control valve MC and associated lever as previously described.

The speed of movement of the rods of each telescopic cylinder with respect to the cylinder portions thereof is proportional to the rate of fluid flow through the respective metering valves MV2, MV3. Accordingly, the speed of extension or retraction of the respective boom sections can be controlled by varying the current applied to the solenoid input coils of valves V2, V3 in order to vary the pilot pressure supplied to valves MV2, MV3. As will be described in detail hereinafter this speed control capability is utilized for controlling soft start and soft stop of the boom sections in order to prevent judder.

The operation of the electro-hydraulic control system of FIG. 4 is essentially the same as that for FIG. 3 in that the upper two cylinders TC2 and TC3 are essentially identical to the two cylinders TC2 and TC3 illustrated in FIG. 3. Likewise the control logic valve 50 including the proportional reducing valves V2 and V3 is identical to that in FIG. 3. Accordingly, the only additional elements within the FIG. 4 control system are the cylinder TC1, the associated holding valve HV1, and the proportional control valve V1, and its associated manual override solenoid valve S1 which are essentially identical in form and operation to the valves V2, V3 in the control module 50. Valve V1 is of the same type as valves V2, V3, and valve V1 is of the same type as valves S2, S3. Therefore, for brevity no further description of the operation of the system of FIG. 4 is required.

The electronic control portion of the electro-hydraulic operating system of the present invention will now be described in conjunction with FIGS. 5 to 8 and the following optimum load Table I.

TABLE I

| | BOOM LENGTH METERS | | | | | | | | |
|---|---|---|---|---|---|---|---|---|---|
| | 10.80 | 16.65 | 18.60 | 22.50 | 26.40 | 30.30 | 34.20 | 38.10 | 42.0 |
| MODE A | | | | | | | | | |
| I-MID | 0 | 50 | 50 | 75 | 100 | 100 | 100 | 100 | 100 |
| C-MID | 0 | 25 | 50 | 75 | 100 | 100 | 100 | 100 | 100 |
| O-MID | 0 | 0 | 0 | 0 | 0 | 25 | 50 | 75 | 100 |
| FLY* | 0 | 0 | 0 | 0 | 0 | 25 | 50 | 75 | 100 |
| | V1<50,V2<25 | V1&V2<75 | | | | V3 | | | |
| | V2<50 | | | | V1&V2<100 | | | | |
| MODE B | | | | | | | | | |
| I-MID | 0 | 0 | 0 | 0 | 0 | 0 | 0 | 50 | 100 |
| C-MID | 0 | 75 | 100 | 100 | 100 | 100 | 100 | 100 | 100 |
| O-MID | 0 | 0 | 0 | 25 | 50 | 75 | 100 | 100 | 100 |
| FLY* | 0 | 0 | 0 | 25 | 50 | 75 | 100 | 100 | 100 |
| | | V2 | | | | | | V1 | |
| | | | | V3 | | | | | |

In the above Table the length of each designated section is expressed as a percentage of the total length in meters in that column for example for a total boom length of 22.50 meters in MODE A the inner-mid section "I-MID" is extended 75% of its length; the center-mid "C-MID" 75% of its length and the outer-mid "0-MID" and the "Fly" 0 (no extension).

Across the bottom of each mode chart the period and sequence of opening of each control valve V1, V2, V3 is illustrated for each associated boom length.

Referring to FIG. 5 there is illustrated a fully powered four-section extensible boom including a base section BS, an inner-mid section IMS, an outer-mid section OMS, and a fly section FS. Mounted on inner-mid section IMS is proportional pressure reducing valve V1 previously described in connection with FIG. 4, and valves V2 and V3 mounted on outer-mid section OMS, previously described and illustrated in FIGS. 3 and 4. Movement of the respective sections of the boom is initiated under control of the central processing unit (CPU) 142 illustrated in FIGS. 5 and 6. Movement of the respective sections of the boom is performed in accordance with either mode A or mode B according to the criteria set forth in Table I which is stored in the "optimum telescope sequence data" block 153 within the microprocessor 140 of the CPU 142. Length signals with respect to each of the movable sections of the boom are detected by transducers T1, T2 and T3 of FIG. 5 which are potentiometers connected to the associated movable boom sections IMS, OMS, and FS. As the respective sections of the boom move length signals L1, L2, L3 are input to central processing unit 142, and compared to the optimum position control data stored within the memory in microprocessor 140. The positions or lengths of the respective movable boom sections are calculated within block 146 of microprocessor 140 and compared in the comparator 152 with the stored loadtable data for the optimum telescope sequence.

Cable reels CR1, CR2 and CR3 are provided to permit electrical signal cables wound thereon to feed, out or in, and continuously communicate with the inputs and outputs of the CPU 142 as the respective sections of the boom extend or retract. The cables are fed into the respective movable sections through terminal blocks TB1 and TB2 to the respective proportioning valves V1, V2, V3. As illustrated in FIG. 5 current signals I1, I2, I3 are fed to the respective proportioning valves V1, V2, V3 as indicated under control of CPU 142 in order to implement the optimum sequences of extension or retraction as controlled by the data in Table I stored within the microprocessor 140.

Another significant feature of the present invention is the ability to control the speed of movement of the respective sections of the boom, both during the middle of its cycle of movement according to a substantially constant speed, and at the beginning and the end of any period of movement. In order to eliminate judder between the respective sections of the boom it is desirable to be able to gradually start movement of any boom section until it reaches a steady state operating speed and to slow the section down just before it reaches the end of its cycle of movement. In other words it is desirable to be able to provide a soft start of the section and a soft stop with substantially constant speeds inbetween.

Figure 7:
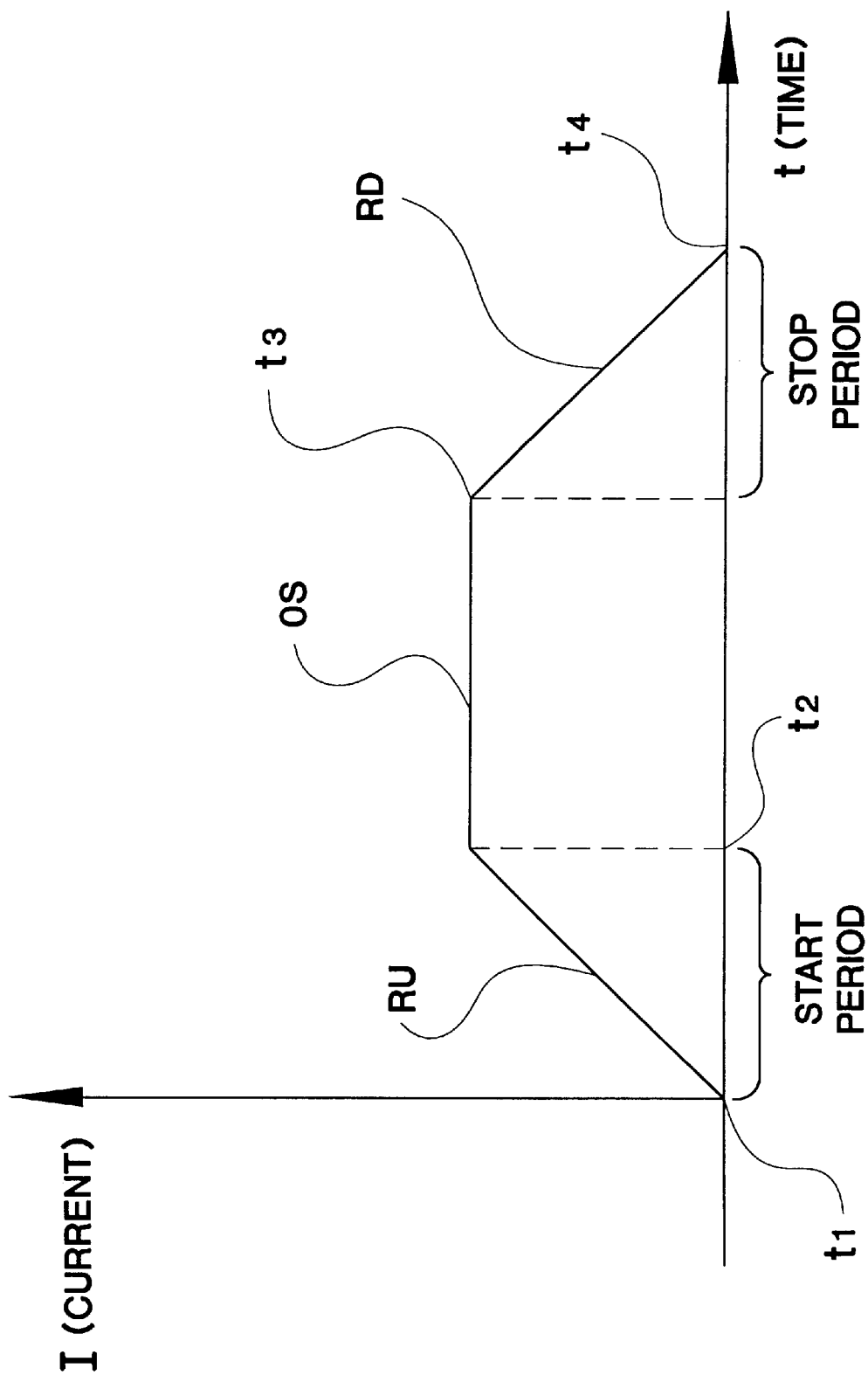
FIG. 7 is a graph illustrating the waveform of a current control signal generated by a ramp generator, applied to the input of appropriate valves in the valving systems illustrated in FIGS. 3 and 4.

This is achieved in accordance with the present invention by use of a ramp generator which generates a current vs. time waveform as illustrated in FIG. 7. As illustrated therein during a start period between times $t_1$ and $t_2$ the current applied to the solenoid coils of the pressure reducing valves such as V1, V2, V3 is ramped up to an operating speed OS. In FIG. 7 the ramp up portion of the current waveform is labeled RU and the operating speed of the waveform is labeled OS. From the time $t_2$ until the time $t_3$ the boom section will move at a substantially constant speed proportional to the substantially constant current being applied to the proportioning valve. Starting at the time $t_3$, which is slightly before the end of the movement of the section at time $t_4$ the current waveform ramps down (as indicated RD) to 0 to stop the section. Accordingly, as these ramp up and ramp down portions of the waveform of current in FIG. 7 are applied to control valves V1, V2, V3, the pilot pressure to the metering valves MV1, MV2, MV3 is proportionately ramped up or down also causing the flow rate of fluid into the telescoping cylinders to be gradually ramped up or down thereby providing the soft start and soft stop periods provided. In a preferred embodiment the ramping up during the start period of movement of a given section occurs until the section has moved about 12 inches, and likewise the ramping down or soft stop function occurs when the section reaches about 12 inches from the end of its desired length of travel. Accordingly, the waveform of the current I in FIG. 7 is supplied through the cables as signals I1, I2, I3 in FIG. 5 described hereinbefore.

Figure 6:
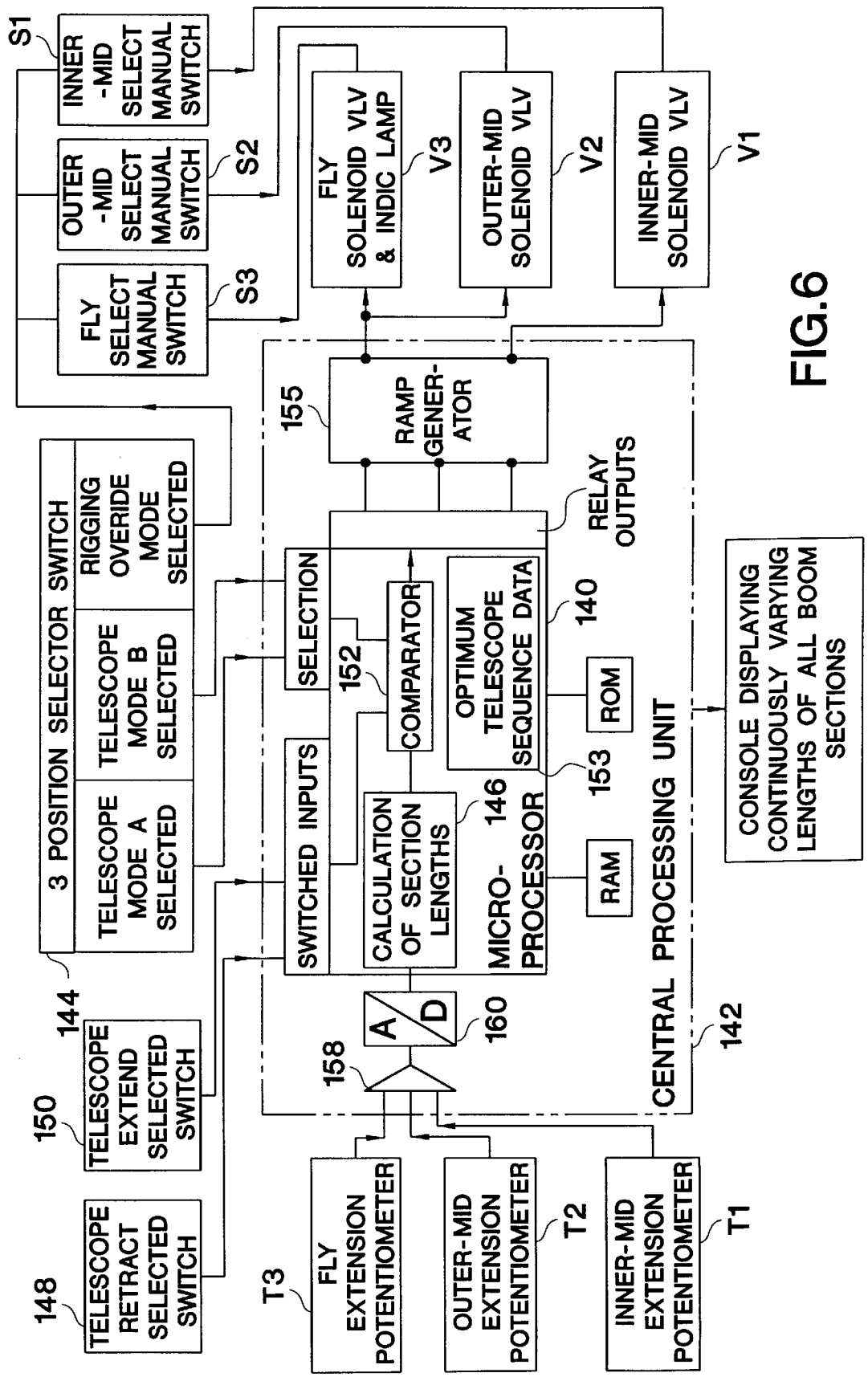
FIG. 6 is an enlarged block diagram of the CPU of FIG. 5 showing further details thereof, and inputs and outputs thereto.

Referring further to FIG. 6 the length signals from potentiometers T1, T2, T3 of FIG. 5 are fed into the central processing unit through an OR gate 158 into an analog to digital converter 160 and in turn into section length calculator 146. The output of section length calculator 146 is then fed into a comparator 152 which compares the position of the respective sections of the boom with those stored in the memory of the microprocessor 140 in load tables in 153. The comparator 152 then outputs appropriate signals to ramp generator 155 which outputs currents having waveforms such as illustrated in FIG. 7 to the respective proportional control valves V1, V2, V3. Each of the associated sections of the boom will move until the signals received from the respective potentiometers T1, T2, T3 input to the central processing unit reach a match as determined by comparator 152. In addition during the cycle, speed will be controlled by the shape of the waveform indicated in FIG. 7. That is, as each boom section is moved it will have a ramping up (soft start) function and a ramping down (soft stop) function.

Ramp generator 155 may have various forms. It could be analogue including RC circuits which charge/discharge to generate the ramps. In such case the generator would simply be turned on and off by clock signals from the microprocessor. In the alternative the waveform for control current could be stored digitally in look-up tables in the microprocessor and read out to apply the waveform to control valves V1, V2, V3.

Other features of the electronic control system portion of the operating system of the present invention illustrated in FIG. 6 include a main control console within the cab of the crane 162 which displays the varying lengths of all boom sections as they are moved for operator monitoring. In addition a threeposition selector switch 144 is provided to initiate the selection of either mode A or mode B of Table I, or a manual rigging override function. This manual override function is implemented by the solenoid valves S1, S2, S3 described hereinbefore with reference to FIGS. 3 and 4.

Also provided are direction switches 148 and 150 associated with the main control valve MC of FIGS. 3 and 4. Telescope retract switch 148 is closed when main control valve MC is in the retract position and switch 150 is closed when main control valve 150 is in the extend position.

Figure 8:
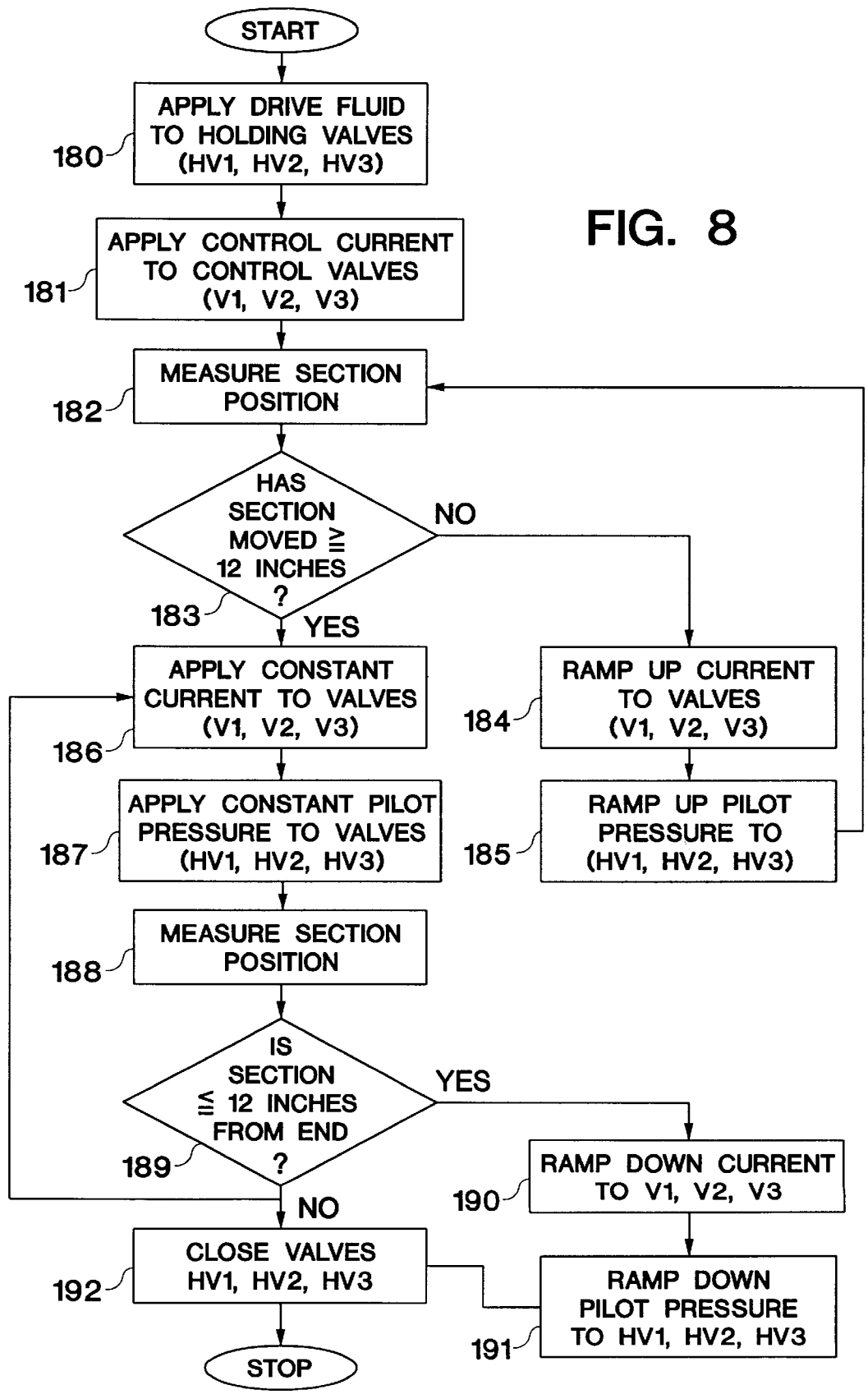
FIG. 8 is a flow chart illustrating the speed control functions implemented by the CPU of FIGS. 5 and 6 and the electro-hydraulic control systems of FIGS. 3 and 4.

A more detailed explanation of the operation of the speed control function implemented by the current waveform of FIG. 7 is provided by the flowchart of FIG. 8.

In a first step 180 drive fluid is supplied to all the holding valves through the master control valve MC in either an extend or retract mode depending on direction of movement of the control lever. Control current in step 181 is then applied to each of the solenoid actuated pressure reducing control valves V1, V2, or V3 in accordance with the load table program stored in the microprocessor. For the sake of simplicity we will assume that the application of current in FIG. 8 is selective, and independent, to one control valve at a time but it should be understood that one or more valves may be actuated simultaneously. In step 182 any given section that is moving has its position measured by the associated potentiometer in FIG. 5, and that the position information is fed to decision block 83 which determines if that section has moved greater than or equal to 12 inches. If the answer is no, the control process moves onto step 184 wherein the current to valves V1, V2, V3 is ramped up. In step 185 the pilot pressure to valves HV1, HV2, HV3 is also ramped up and the position of the section continues to be measured in block 82. Once the position of the section is determined to be greater than or equal to 12 inches from its initial position the process continues to step 185 wherein constant current is supplied to valves V1, V2, V3 in order to achieve a substantially constant operating speed of the section being controlled. In the next step 187 a constant pilot pressure is applied to valves HV1, HV2, HV3 and in the following step 188 the position of the section is measured by the appropriate length potentiometer in FIG. 5. The length measurements are then fed to decision block 189 wherein it is determined if the section is less than or equal to 12 inches from the end of its desired length of travel according to the program stored in the microprocessor. If the answer is yes the current applied to valves V1, V2, V3 is ramped down resulting in step 191 wherein the pilot pressure is also ramped down to valves HV1, HV2, HV3 in order to slow down movement of the section and provide a soft stop. As illustrated in block 192, the ramping down results in the pilot pressure reaching essentially 0 and the closing of holding valves HV1, HV2, HV3 ending the cycle of movement of the section being controlled.

Preferably each cycle of movement of any given section is controlled according to the current waveform illustrated in FIG. 7 which includes a ramping up and ramping down function as well as an intermediate substantially constant speed function. However, it is well within the scope of the present invention to eliminate the ramp up portion of the current control waveform and only ramp down in order to provide a soft stop. Likewise it is possible to provide only a ramp up or soft start function and to eliminate the soft stop function. It is also within the spirit and scope of the present invention to gradually ramp up the current during the entire operating cycle of movement or to gradually ramp down the current for the entire operating cycle of movement.

A preferred structure of the holding valves HV1, HV2, HV3 according to the present invention is illustrated in FIGS. 9A to 9C. FIG. 9A shows the metering valve in a closed position before pilot fluid above a sufficient threshold is supplied to open the valve and FIG. 9B shows the valve in an open state after pilot fluid above the threshold has been applied. FIG. 9C is a cross-sectional view taken along line 9C—9C of FIG. 9A.

The main components of the valve include a housing assembly 70 surrounding a concentrically disposed valve cartridge 58 which defines a metering cavity therein. At least one inlet port 74 is provided in housing assembly 70 in alignment with a port 64 through cartridge 58. Preferably a plurality of equally spaced inlet ports are provided about cartridge 58 for supplying fluid to the metering cavity. At least one output port 72 is provided in housing assembly 70 in alignment with an output port 62 in the wall of cartridge 58. A plurality of these output ports are preferably provided at equally spaced intervals about the cylinders defining the metering cavity. A valve seat 60 in the shape of a raised ring extends around the inner surface of cartridge 58 at a position intermediate the inlet and output ports 64, 62. A pilot chamber 75 is provided in one end of housing assembly 70 in communication with a pilot port 76.

A reciprocating pilot control element 52 is disposed on fluid communication with pilot chamber 75 and is displaceable in proportion to the pressure of pilot fluid input to pilot port 76. Control element 52 is mounted within a central bore of an end cap 50 which operatively engages an open end of cartridge 58. End cap 58 is fixedly connected to cartridge 58 and control element 52 is movably mounted for reciprocation within a central bore of cap 50. Control element 52 has a pan-shaped head 52A which fits into a recess in an end of a movable valve spool 54. Accordingly, movement of control element 52 by pilot fluid is transferred to the movable valve spool 54 through control element 52 attached thereto.

Valve spool 54 has spaced end flanges 54A and 54B and an intermediate metering flange 54C in operative engagement with valve seat 60 within the metering cavity. The position of the metering flange 54C with respect to the valve seat 60 provides varying flow rates controlled by metering channels 56 formed in the metering flange 54C. These metering channels are illustrated in the cross-sectional view of FIG. 9C in more detail. Channels 56 present variable volume flow passages to fluid flow past the valve seat 60 proportional to the displacement of the spool 54 in response to pilot pressure signals input to port 76.

The valve assembly of FIGS. 9A–9C is very compact in that the valve spool 54, the pilot chamber 76 and control element 52 are all disposed substantially inline on a common longitudinal axis of the housing assembly 70. Furthermore, the thermal relief valve 80 is disposed within a central bore of the spool 54. Valve 80 includes a spring-loaded check ball 86 connected to a reciprocable valve stem 87 surrounded by a coil spring 88 which normally holds the check ball 86 in a closed position across input passage 82. Input passage 82 is in fluid communication with the metering cavity so when pressure in the metering cavity exceeds a predetermined limit determined by the force of coil spring 88 check ball 86 is unseated from passage 82 permitting fluid from the metering cavity to be vented through thermal relief valve 80 and out of passage 84 and through input ports 64, 74. Venting would occur for example if the temperature of the fluid within the metering cavity exceeded a predetermined safe limit due to high ambient temperatures surrounding the valve housing 70.

The valve spool 54 is normally biased to a closed position in the absence of the application of pilot pressure through port 76 by a coil spring 92. Coil spring 92 is disposed within a housing assembly 90 and has a conical button 96 on one end thereof which operatively engages a recess in an end of spool 54 adjacent flange 54A. A plug 93 is provided in the end of spring assembly housing 90 and is provided with a central bore 94 for connection to a drain line to avoid the accumulation of undesired fluid pressure in the spring housing.

Suitable O-ring seals are provided between the various operating components of the valve assembly as indicated.

A longitudinal passage 63 is provided in spool valve element 54 and extends completely therethrough in order to permit pressure equalization on the outside surfaces of the distal ends of spool valve 54 within the cartridge 58 in essentially all positions of the spool 54.

The operation of the valve assembly of FIGS. 9A to 9C will now be described. The components of the valve are normally disposed in the closed position as illustrated in FIG. 9A. When pilot pressure is applied through port 76 to pilot chamber 75 this pushes control element 52 to the left in proportion to the pilot pressure applied. Since valve spool 54 is connected to control element 52 it also moves to the left unseating sealing flange 54C from valve seat 60. This permits fluid to flow through metering slots 56 around valve seat 60 and thus fluid flows from input port 64, 74 through output ports 62, 72. The rate of fluid flow is controlled by the position of flange 54 with respect to valve seat 60 and the degree to which the metering slots 56 are opened. In the position illustrated in FIG. 9B the valve is fully open. In this fully open position the maximum flow rate through the metering valve is provided and at intermediate positions between the closed position of FIG. 9A and the fully open position of FIG. 9B different flow rates occur in proportion to the pressure of the pilot fluid applied to the pilot port 76. Therefore, The flow rate of fluid through the metering valve portions of the holding valves is ultimately controlled by the magnitude of the control current applied to the control valves HV1, HV2, HV3 described hereinbefore.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An electro-hydraulic operating system for an extensible boom, said boom having at least three telescoping sections, comprising:

at least two fluid motors coupled to the boom sections for imparting relative motion therebetween to extend or retract the boom;

a source of pressurized hydraulic drive fluid for powering the motors; and valve means associated with each of the fluid motors, each valve means, coupled in fluid communication with the source of fluid and the associated fluid motor, for selectively supplying the pressurized hydraulic drive fluid to the associated fluid motor in response to electrical control signals;

each valve means including, a solenoid valve, in fluid communication with the source of pressurized hydraulic drive fluid and the associated fluid motor, having an input for receiving electrical control signals with variable characteristics proportional to desired speeds of movement of the boom section driven by the fluid motor, said solenoid valve varying the pressure of the drive fluid available for application to the associated fluid motor, and outputting variable pressure pilot signals; and a metering valve, associated with each valve means, for receiving the variable pressure pilot signals output from said solenoid valve of the associated valve means and supplying the hydraulic drive fluid to the associated fluid motor at flow rates proportional to the variable pressure pilot signals.

2. The operating system of claim 1 including programmable electronic control means for supplying said electrical control signals to each of the solenoid valves of said valve means.

3. The operating system of claim 2, the characteristics of the electrical control signals being such that a fluid motor moves an associated boom section at gradually increasing speeds during a starting period of any cycle of movement of the section, at a second substantially constant speed during an intermediate period of the cycle, and at gradually decreasing speeds during a stopping period preceding the end of the cycle of movement.

4. The operating system of claim 2, the characteristics of the electrical control signals being such that a fluid motor moves an associated boom section at gradually increasing speeds during a starting period of any cycle of movement of the section.

5. The operating system of claim 2, the characteristics of the electrical control signals being such that a fluid motor moves an associated boom section at gradually decreasing speeds during a stopping period preceding the end of any cycle of movement of the section.

6. The operating system of claim 2 wherein the fluid motors comprise hydraulic cylinders having relatively movable rods and cylinders, said rods having longitudinal conduits therethrough for accommodating the flow of the hydraulic drive fluid to successively connected hydraulic cylinders.

7. The operating system of claim 1 wherein each metering valve comprises:

a housing assembly defining a metering cavity therein, at least one inlet port for supplying the drive fluid to be metered to the cavity, at least one output port for outputting metered drive fluid from the cavity, a valve seat in the cavity disposed between the input and output ports, a pilot chamber and a pilot port to said pilot chamber;

a control element in the pilot chamber displaceable in proportion to the pressure of pilot signals input to said pilot port; and a valve spool mounted for reciprocating movement in said metering cavity, said spool being coupled to the control element and displaceable therewith, said spool having a metering flange for operative engagement with the valve seat in the cavity, the position of said metering flange with respect to said valve seat controlling variable flow rates of drive fluid between the input port and output port of the valve housing assembly.

8. The operating system of claim 7 wherein the metering flange of the metering valve has metering channels formed therein extending transversely of the valve seat, said channels presenting variable volume flow passages to fluid flow past the valve seat proportional to the displacement of the spool.

9. The operating system of claim 7 wherein each metering valve further includes a thermal relief valve disposed within said spool and movable therewith for venting fluid from said cavity to said at least one input port when pressure of fluid in said cavity exceeds a predetermined limit.

10. The operating system of claim 1 wherein the fluid motors comprise hydraulic cylinders having relatively movable rods and cylinders, said rods having longitudinal conduits therethrough for accommodating the flow of the hydraulic drive fluid to successively connected hydraulic cylinders.

11. The operating system of claim 1 comprising at least four boom sections and at least three fluid motors.

12. The operating system of claim 11 wherein the fluid motors comprise hydraulic cylinders having relatively movable rods and cylinders, said rods having longitudinal conduits therethrough for accommodating the flow of the hydraulic drive fluid to successively connected hydraulic cylinders.

* * * * *